March 3, 1964 R. MOSER ETAL 3,123,742
HIGHLY SENSITIVE ELECTRIC RELAY
Filed June 2, 1960 3 Sheets-Sheet 1
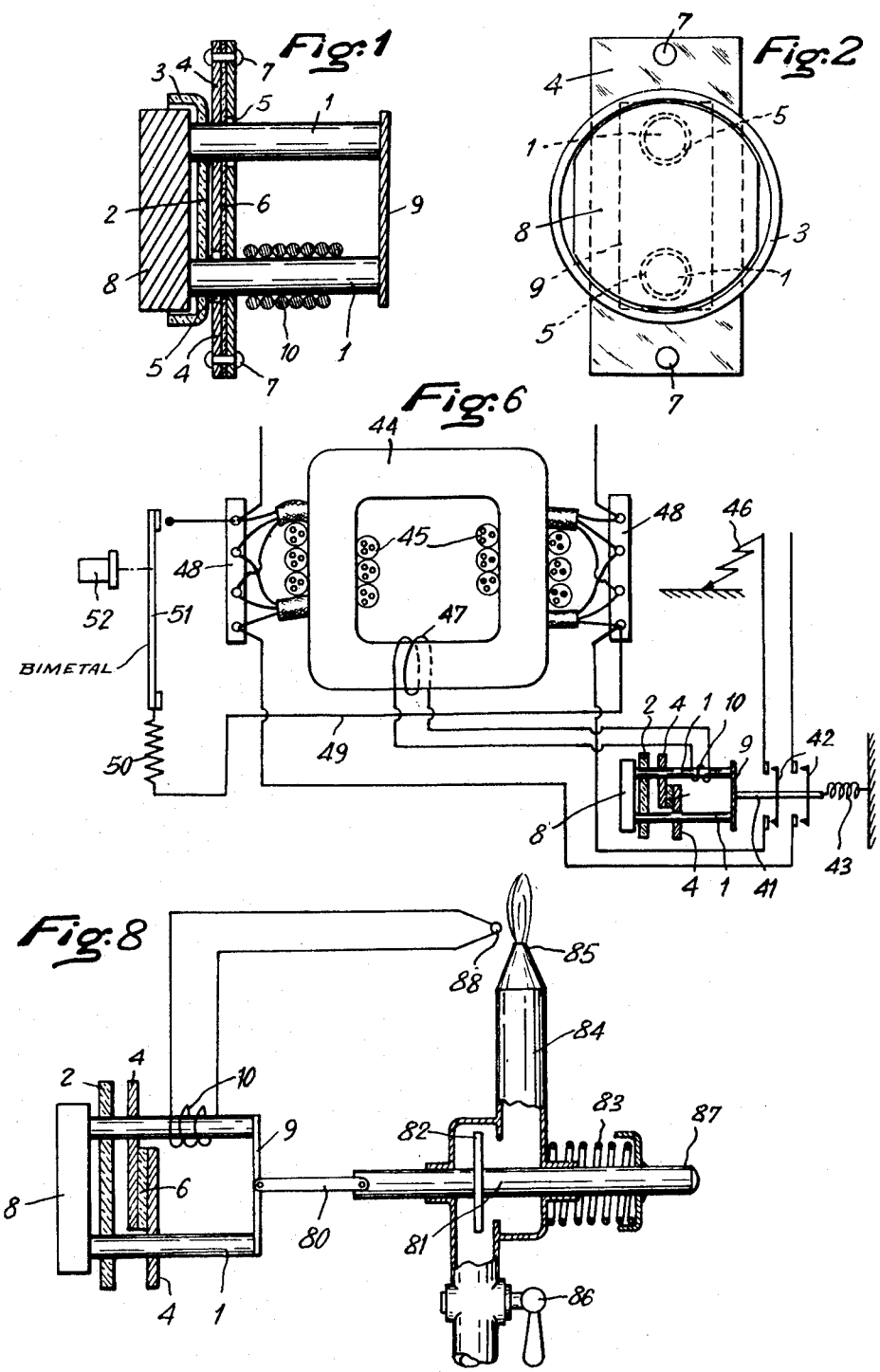

March 3, 1964  R. MOSER ETAL  3,123,742
HIGHLY SENSITIVE ELECTRIC RELAY
Filed June 2, 1960  3 Sheets-Sheet 2

United States Patent Office 3,123,742
Patented Mar. 3, 1964

3,123,742
HIGHLY SENSITIVE ELECTRIC RELAY
Robert Moser, 9 Rue du Lycée Lakanal, Bourg-la-Reine, France, and Jacques Morel, 12 Rue Rennequin, Paris, France
Filed June 2, 1960, Ser. No. 33,461
Claims priority, application France June 8, 1959
7 Claims. (Cl. 317—58)

Our invention has for its object an electric relay showing a high sensitivity so that it may be released under low power conditions, while said sensitivity is furthermore adjustable within a broad range.

So-called polarized relays are known which include two pole-pieces cooperating with the armature of the relay, the magnetic flux passing through said pole-pieces depending on the induction produced, on the one hand, by a permanent magnet and, on the other hand, by a winding adapted to be fed with electric current. The magnetic flux generated by the winding is incorporated with the magnetic flux of the permanent magnet, or else, it wipes it out. However, in such relays, the reluctance of the permanent magnet is so high that the electromotive force required for wiping out the flux of the permanent magnet in the pole-pieces rises above the value practically available.

It has been proposed, consequently, to provide in such relays a magnetic shunt between the two pole-pieces, so that the flux induced by the winding may close over said magnetic shunt, while the flux of the permanent magnet also closes over said shunt and the magneto-motive force across the ends of the pole-pieces is equal at a maximum to that arising between the two permanent magnets of the shunt. The magnetic material forming the shunt is substantially saturated, so as to produce a sufficient magneto-motive force. Consequently, on the one hand, the characteristic operative features of the relay depend on the characteristic magnetization curve of the material forming the shunt, which curve may vary in practice for any particular material and, furthermore, the material being substantially saturated, a predetermined modification of the flux requires a high number of ampere-turns, i.e. a high electro-motive force and this prevents producing highly sensitive relays. Consequently, such polarized relays serve chiefly in control systems for which the available power is high.

Our invention has, in contradistinction, for its object to produce a polarized relay operating under low powers of the order of a few hundred micro-volt amperes, adapted for use in protecting apparatus and in the case of a feeding controlled by a thermo-couple.

Our improved electric relay is constituted by a permanent magnet including two pole-pieces cooperating with the armature of the relay, at least one electric winding and a magnetic shunt inserted between the pole-pieces, the novel feature of said relay consisting in that a shunt is constituted by two polar masses separated by a gap of a reduced breadth and having a large area, while the relay winding surrounds one or both pole-pieces between the magnetic shunt and the armature.

The adjustment of sensitivity is obtained by adjusting the magnetic flux generated in the relay by the permanent magnet, as provided advantageously by a shifting of the magnet poles with reference to the pole-pieces, with a view to adjusting the intensity of the main flux of the relay, or else, by providing an unvarying or adjustable magnetic shunt, so as to adjust the flux passing through the relay armature.

According to a preferred embodiment, each pole-piece is provided at its end cooperating with the armature blade with a section of a reduced diameter, its terminal surface being polished so as to provide a gap of a few microns with the armature blade and said pole-piece is provided at its end opposed to the armature blade with a section of a larger diameter over which is fitted, with a force fit, a plate of a highly magnetic metal adapted to form the shunt and the surface of which is much larger than the terminal surface of the pole-pieces. Said plates are provided with an opening which allows the passage through it of the other pole-piece with a substantial clearance therebetween and said magnetic plates are furthermore longitudinally shifted with reference to each other so that, after treatment and fitting, they may be superposed with the interposition between them of a thin layer of an amagnetic material. The plates of the shunt enclosing said thin sheet of amagnetic material are rigidly secured to each other and to a carrier plate of amagnetic metal through rivets also made of amagnetic material. The angularly shiftable permanent magnet is axially perforated, so as to be held by a threaded amagnetic member screwed into a tapping of the amagnetic carrier plate.

When the relay is to be applied to a circuit-breaker and in order to provide for the resetting of the relay, the armature is held in contact with the pole-pieces through an elastic blade released by the release of the circuit-breaker, the shifting of said plate being braked by a mass rigid therewith.

Further features of our improved relay of a high adjustable sensitivity will appear in the reading of the following description of two embodiments of the relay and of various applications of the latter, reference being made to the accompanying drawings, wherein:

FIG. 1 is a sectional diagrammatic view passing through the pole-pieces of a first embodiment of the relay.

FIG. 2 is an end view of the relay seen in the direction of the arrow II—II of FIG. 1, after removal of the electric winding.

FIG. 6 is a wiring diagram of the relay when substituted for a conventional relay in a safety switch operating on leak currents.

FIG. 8 is a wiring diagram for the relay as used in an automatic arrangement for stopping the flow of gas upon extinguishing of a flame fed by said gas.

Figure 3:
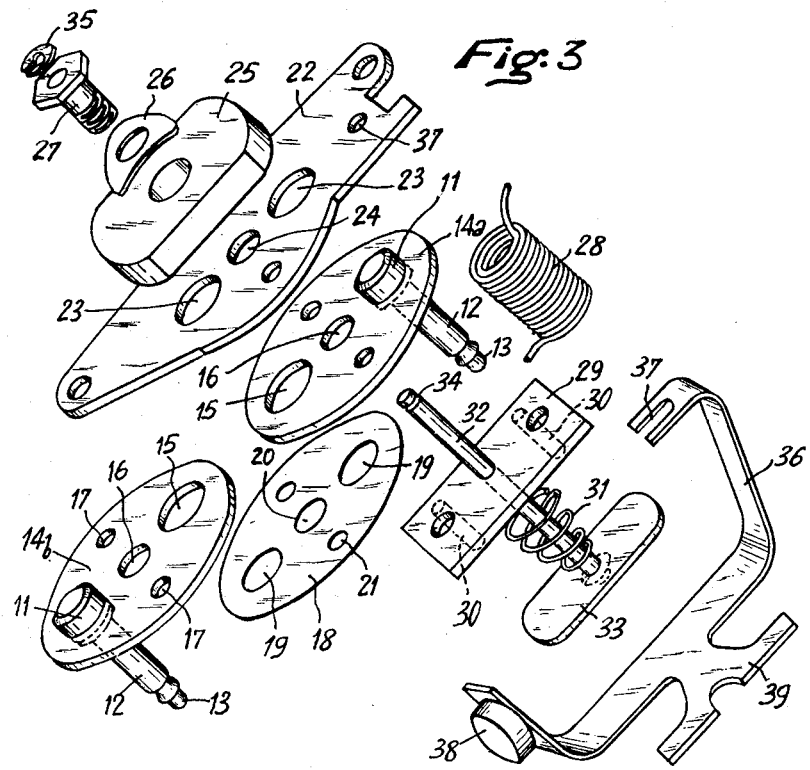
FIG. 3 is an exploded perspective view of the different elements of the relay in accordance with a second embodiment.

The relay illustrated in FIGS. 1 and 2 includes two pole-pieces 1 fitted with a force fit in a carrier plate 2 of red copper, the edge 3 of which is raised so as to form a circular dished part. On each pole-piece 1 is fitted with a force fit a small plate of mild steel 4 forming a polar mass. Each plate 4 is provided with a port through which passes, with a clearance, the other pole-piece. Between the two polar masses is inserted a mica sheet 6 and the system including the two steel plates 4 and the mica sheet is held fast by the copper rivets 7; such an assembly allows the conventional annealing at a high temperature after machining, with a view to obtaining optimum magnetic properties.

The magnet 8 is a permanent magnet of a generally circular shape inserted in the dished plate 2 which bears against the corresponding ends of the pole-pieces. The armature 9 is constituted by a blade of mild steel engaging the outer ends of the pole-pieces. The convolutions of the winding 10 surround one or both pole-pieces between the polar masses 4 forming the shunt and the ends of the pole-pieces cooperating with the armature 9.

It is apparent that the permanent magnet 8 generates a total flux, of which a part closes over the pole-pieces 1 and the polar masses 4. The intensity of said flux may be varied by causing the magnet 8 to rotate inside the dished member 2. When the poles of the magnet 8 register with the axes of the pole-pieces, the flux inside the magnetic circuit closed by the polar masses is a maximum and it sinks to zero when the line connecting the poles of the magnet 8 is perpendicular to the plane passing through said axes of the pole-pieces.

The flux closing over to the polar masses 4 and the gap formed by the mica blade produce a magneto-motive potential which produces in its turn a magnetic flux passing through the pole-pieces 1 and the armature 9, last-mentioned flux depending on the reluctance of said circuit and on said magneto-motive potential.

Lastly, the winding 10 produces in the circuit formed by the pole-pieces 1, the polar masses 4 and the armature 9 a flux adapted to act in opposition with or in the same direction as the flux produced by the magneto-motive force according to the application to be considered. In the case of the flux produced by the winding acting as a demagnetizing flux, it is possible, through a suitable selection of the values defining the magnetic circuit and the materials to be used, to obtain a minimum reluctance which requires only a very low demagnetizing force with an impedance which is also very low, the threshold flux approximating zero.

This result is obtained in accordance with our invention by a careful selection of the grade of the surface of the ends of the pole-pieces and of the armature, so as to reduce the gap between the pole-pieces and the armature when engaging each other to a few microns, preferably two microns and by resorting to a magnetic shunt, the gap in which has a large surface with reference to the surface of the pole-pieces, say a very small gap of the order of fifty to a few hundred microns.

Relays with a magnetic shunt without a gap or already known, but if it is desired, with such relays, to obtain the flux required for the adherence of the armature, it is necessary to resort to a magnetic shunt lying in the vicinity of the point of saturation. The result is that the energy required for operation is then much higher.

As a matter of fact, in the case of our improved relay and considering armature gaps of a breadth of 2 microns and an area of 0.05 sq. cm. and a shunt having a gap of 100 microns, with a surface of 5 sq. cm., if the induction required for obtaining the desired force of attraction for the armature blade is equal to 5,000 gauss, the flux in the circuit of the gaps associated with the armature should be equal to $5,000 \times 0.05 = 250$ maxwells.

The flux produced by the permanent magnet is distributed in the shunt and in the circuit constituted by the pole-pieces and the armature as a function of the reluctance of the circuits, but the magnetic permeability of the material used being very high, it is possible to take into account only the reluctances of the gaps in the two circuits; said reluctances are equal to $0.0004/0.05 = 0.008$ in the case of the armature circuit and to $0.01/5 = 0.002$ in the case of the shunt 7. The flux is therefore four times higher in the shunt than in the armature and it is equal to 1,000 maxwells with an induction of $1,000/5 = 200$ gauss.

The magneto-motive force across the terminals of the shunt should be therefore equal to $0.8 \times 1,000 \times 0.002 = 1.6$ which is equal to the value required across the pole-pieces, to wit: $0.8 \times 250 \times 0.008$.

In order to wipe out the flux in the armature blade, it is necessary to make a flux of 250 maxwells pass through the shunt equal to the flux precedingly generated in said armature blade by the magnet; but this flux must be generated in the shunt gap and in the armature gaps in series, i.e. in a circuit having a total reluctance of 0.01 and the total magneto-motive force required is equal to $0.8 \times 250 \times 0.01 = 2Ni$.

Figure 5:
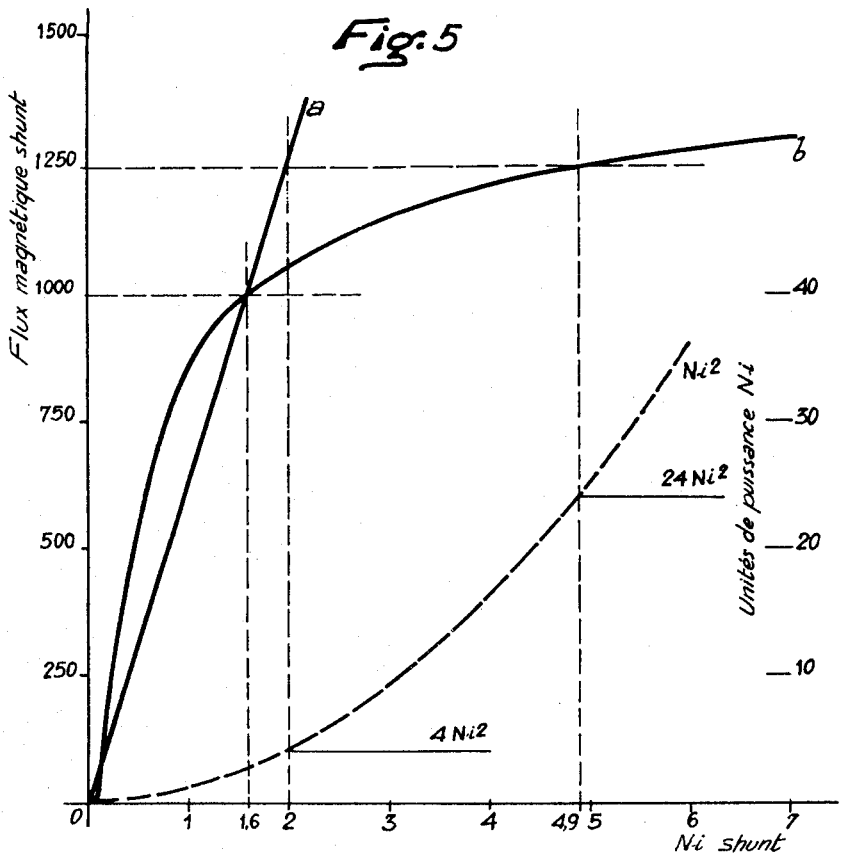
FIG. 5 shows explanatory curves defining the difference between an iron shunt relay and a relay incorporating a gap.

Considering an equivalent relay with a shunt of magnetic material, the magnetizing curve $b$ of which is shown in FIG. 5, if it is desired to obtain across the terminals of the shunt a magneto-motive force of $1.6Ni$ with a magnetic flux of 1,000 maxwells in the shunt, the latter should be near the point of saturation. To make a supplementary flux of 250 maxwells pass through said shunt, the curve shows that it is necessary to resort to a magneto-motive force equal to 4.9 ampere turns $Ni$.

The power required in both cases is proportional to the square of the number of ampere turns and the powers required are, in the present example, in a ratio as between 4 and 24. In other words, the power is six times larger in the case of a solid iron shunt.

Furthermore, with a reluctance constituted by air, it is an easy matter to adjust the value of the reluctance by acting on the surface and the length of the gap, whereas with a reluctance of magnetic material, the properties of the material are binding, which are not constant and are liable to be modified by the treatment which is always required for a high grade relay.

Figure 4:
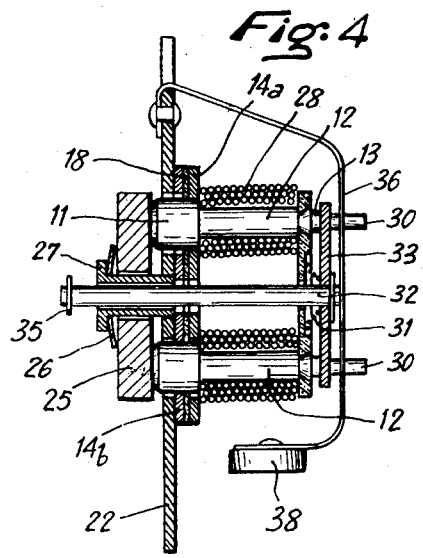
FIG. 4 is an axial sectional view passing through the pole-pieces of the relay of FIG. 3 in its assembled condition.

In the embodiment illustrated in FIGS. 3 and 4, the two pole-pieces of magnetic material are provided each with a body 11 of a large cross-sectional area, so as to allow the passage of the totality of the flux with a reduced induction, said body carrying a section 12 forming the winding core of a smaller cross-sectional area and a terminal section 13 of a still smaller cross-sectional area, so as to produce in registry with its terminal surface a high induction and, consequently, a high attractive force. In the example given hereinabove and discussed numerically, said surface is equal to 0.05 sq. cm.; the terminal surface of the section 13 is glazed. Each pole-piece is fitted with a force fit in a washer 14 of a highly magnetic material. One of said washers, 14a is secured over the bodies 11 in a manner such that its surface registers with the lower surface of said body, the other washer, 14b, having its surface spaced with reference to said lower surface by the thickness of one washer increased by 100 microns in the case of the precedingly described example. The washers 14 are provided at a point diametrically opposed to the corresponding body 11 with an opening 15, the diameter of which is slightly larger than the diameter of the body, each washer being provided furthermore with an axial port 16 for the passage of the armature-carrying rod 32 described hereinafter and with rivet holes 17.

A washer 18 of an amagnetic material, of a thickness of 100 microns, the diameter of which is equal to that of the washers 14, is provided along a diameter with two bores 19 registering with the ports 15 respectively in the washers 14. Said washer 18 is positioned over the washer 14a, so that the body 11 of the corresponding pole-piece passes through the opening 19 in said washer 18. The washer 14b carrying the other pole-piece is then fitted over the system obtained, so that the sections 13 and 12 of said pole-piece may extend through the washers 18 and 14a, the portion of the body 11 projecting underneath the washer 14b engaging the opening 15 in the washer 14a with a clearance. The opening 15 in the washer 14b serves similarly for the passage of the first-mentioned pole-piece.

The assembly of said parts forms the magnetic section of the relay, including the pole-pieces and the shunt. These components are rigidly interconnected and clamped together by clamping rivets of an amagnetic material passing through the ports 17 and 21, said rivets securing them also to a carrier plate 22 of aluminium or the like metal. The carrier plate is provided with perforations 23 for the passage therethrough of the bodies 11 and with a central opening 24 registering with the ports 16 and 20, said opening 24 being however tapped.

A permanent magnet 25 may rock inside a circular area of a diameter slightly larger than the distance between the extreme points of the bodies 11; said magnet is in contact with the latter and is held in position by the elastic washer 26 tightened by an amagnetic member 27 passing through an axial perforation in the magnet and screwed into the tapped opening 24. The member 27 is axially perforated so as to guide the armature rod 32. The magnet is thus revolvably carried with reference to the member 27 and it is held fast by a clamping of the washer 26.

The windings 28 are inserted over the pole-piece upright sections 12 and are connected in series. They are held in position by a clamping plate 29 of plastic material which is fitted over the ends of the pole-piece sections 12, while leaving the end sections 13 free. Said clamping plate 29 is rigid with two studs 30 which guide the armature 33, while the outer surface of plate 29 is provided, in registry with the perforation in the armature, with a circular recess adapted to house the inner end of a frusto-conical coil spring 31.

The armature-carrying rod 32 extends axially through the above-mentioned elements 29, 14, 18, 22, 25 and 26. It carries at its end facing the pole-pieces the armature 33 of high grade magnetic material. Its opposite end is provided with a groove 34 engaged by a circlips washer 35.

The arrangement which has been described forms the actual relay, which relay is released, as shown by experience, with a consumption of about 400 microvolt amperes without any risk of an untimely release. The actual relay has a bulk corresponding to a diameter of about 2.5 cms. and a length of 2.5 cms., while its attractive force is of a magnitude of 100 grs.

To allow said relay to be set through a release of a circuit-breaker, there is associated therewith an elastic blade or fitting 36 secured laterally at 37 to the carrier plate 22, so as to bear against the armature on the rod 32, said blade being weighted at its free end by a small weight 38. The bending of the blade 36 is such that it urges the armature 33 against the terminal surfaces of the pole-pieces in antagonism with the spring 31. It is provided, furthermore, with a hook-shaped section 39.

FIG. 6 shows how the above-described highly sensitive relay may be incorporated with a safety switch operating upon production of a leak current towards ground. The principle of a relay actuated by a transformer sensitive to the lack of equilibrium between the neutral and the phase such as may be produced by a leak of current is well-known in the art, but the known arrangements resorting to electromagnets or to conventional relays with permanent magnets show serious drawbacks. The former require a high magnetizing force and the magnetic flux at its threshold of operation induces in the winding a counter electromotive force such that impedance may reach a value which is a multiple of that of the ohmic resistance. The value of the current defining operation through attraction of the armature is not consistent, by reason of the magnetizing force and of the impedance, with the sensitivity it is desired to obtain for the detection of leak currents which might be dangerous for human beings. The second known arrangements of the relay type referred to induce in the relay a flux wiping out the flux of a permanent magnet, but the wiping out flux which does not pass through the permanent magnet requires a high demagnetizing force, the coercive force being generally very high. Said wiping out flux closes only thus through leaks, which leads to a high reluctance and does not allow ensuring with such conventional relay type arrangements the desired protection against low intensity leak currents and such arrangements cannot be used for detecting leak currents of a few milliamperes.

The high sensitivity relay according to our invention avoids such drawbacks. To this end, the armature 9 of the relay (FIG. 6) is rigid with the control rod 41 of the switch 42 and draws the latter out against the action of the opening spring 43.

The relay is fed by a transformer sensitive to leak currents and constituted, as well-known in the art, by a closed magnetic circuit 44 over which windings 45 inserted in series, respectively with the neutral and the phase or with two feeding phases, are mounted in opposition.

In the case where the ampere turns provided by each of the windings 45 are equal and in opposed relationship, no flux passes through the magnetic circuit 44 of the transformer.

But, in the case of a lack of equilibrium such as may be provided by a leak towards ground at 46 on one of the winding circuits, the flux resulting therefrom in the magnetic circuit induces in the secondary 47 a counter electromotive force acting on the winding 10 of the relay with which it is connected, so as to release the relay.

In the embodiment illustrated, the winding of the transformer is constituted by multiwire cables, the different sections constituted by said wires being inserted in series through the agency of the commutator 48. Said embodiment is of a particular interest in the case of a winding including a large number of convolutions. The drawing shows cables with three wires, but the number of wires may be selected as desired.

The safety switch operating upon leaking of current is associated with a circuit controlling the proper operation of the relay, said circuit controlling furthermore the heating of the transformer under the action of the load. Said control circuit includes between a point of one of the feed wires beyond the transformer 44 and a point of the other wire ahead of said transformer a shunt circuit 49 including a resistance 50 corresponding to the threshold of guaranteed operation of the relay and a switch 51 constituted by a bimetallic contact blade housed inside the bulk of the transformer and adapted to be controlled by a pusher knob 52. Upon manual closing of the circuit over the switch 51 by the pusher knob 52, there flows through the resistance 50 a leak current corresponding to the release of operation of the relay. In the case of an exaggerated heating ascribable to an overloading of the transformer, the bimetallic blade 51 closes automatically the switch and produces the leak current which releases operation of the relay.

Figure 7:
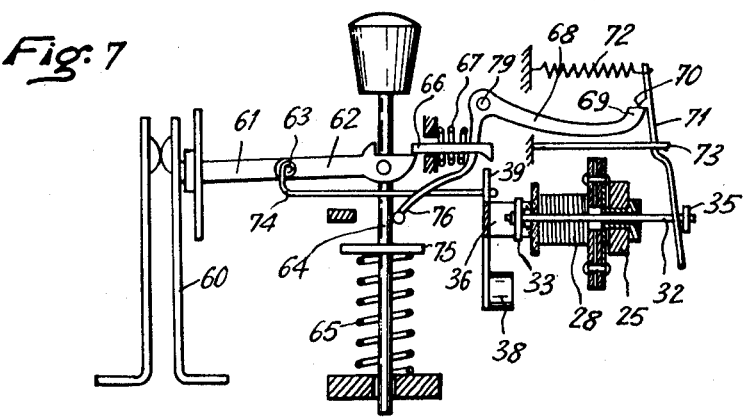
FIG. 7 is a diagrammatic illustration of the relay of FIGS. 3 and 4 incorporated with a circuit-breaker in its set position.

FIG. 7 illustrates diagrammatically the association of the relay according to FIGS. 3 and 4 with a circuit-breaker operating in accordance with the principle underlying the wiring diagram of FIG. 6.

The contact-pieces 60 of the circuit-breaker are held in contact by a thrust-exerting toggle link 61, 62 pivotally secured at 63, the expansion or collapse of the toggle link being controlled by a rod 64 perpendicular thereto and urged by a spring 65 in the direction of release, said rod being held in the toggle-engaging position by an abutment 66.

The latter is adapted to be collapsed by the spring 67 which acts on the bent lever 68 pivotally secured to a spindle 79 and engaging said abutment 66. The action of said spring 67 is balanced by the engagement of the nose 69 on the lever 68 underneath the stop 70 carried by a plate 71 urged into its operative position by a spring 72.

At its end opposed to said spring 72 with reference to its pivotal point 73, said plate 71 is provided with a port engaged by the rod 32 of the above-mentioned relay, the washer 35 positioned outside said plate 71 cooperating with the edges of said port. A strap 74 pivotally secured at 63 encloses the hook-shaped section 39 on the elastic blade 36 of the relay.

Referring again to FIG. 7, the arrangement is illustrated in its normal operative position, the circuit-breaker being in its engaged position. The armature 33 of the relay is attracted by the induction produced by the permanent magnet 25. The elastic blade 36 is urged away from the armature 33 by the strap 74 drawn outwardly by the toggle link 63. If the releasing current of a power of, say 400 microvolt-amperes supplied by the winding 47 of FIG. 6 flows through the windings 28, the magnet flux is periodically wiped out in the armature blade. The spring 31 urges away said armature blade 33 which, in its turn, produces, through the rod 32 and the washer 35, a rocking of the blade 71 which releases the nose 69 on the lever 68, so that the latter rocks and makes the abutment 66 collapse. The circuit-breaker is thus released under the action of the spring 65 and the strap 74 shifted towards the relay releases the blade 36 which sets the relay again in its operative condition. The speed of resetting is however limited by the inertia of the small mass 38, which prevents the armature from being deformed through impact against the pole-pieces. The spring 72 returns the plate 71 into its starting position and the lever 68 is returned into its operative position, for instance through abutment of a plate 75 carried by the rod 64 against the opposite end 76 of said lever 68. When the circuit-breaker is reset, the strap 74 urges again away the elastic blade 36 and, if the current which has released the relay is no longer present, the original conditions are again obtained. The circuit-breaker is described hereinabove in a diagrammatic manner, since the arrangement disclosed may be associated with any type of circuit-breaker.

The relay according to our invention may also serve, as shown in FIG. 8, for the control of a safety valve in a gas-feeding pipe. Such valves controlled by a thermo-couple have already been proposed in a theoretical manner but, in practice, they cannot be associated with conventional relays. The armature 9 of the relay is connected by a link 80 with the rod 81 controlling a valve 82 which is urged by a spring 83 into a position closing the pipe 84 feeding the burner 85. Said valve is located on the downstream side of a stop cock 86 and the end of its rod 81 forms a pusher member 87 which allows opening the valve for ignition of the gas with a simultaneous application of the armature 9 in contacting relationship with the pole-pieces 1. The winding 10 of the relay is fed by a thermo-couple 88 located in the vicinity of the burner flame at 85. The flux induced in the relay by the magnetomotive potential in the gap 6 between the polar masses 4 is not normally sufficient for holding the armature against the pressure of the spring 83. The winding 10 is however wound in a manner such that it induces a magnetic flux which is added to the original flux under the action of the current generated by the thermo-couple 88 heated by the burner. The magnetic flux developed by the thermo-electric energy is sufficiently high and closes across the polar masses and the gap therebetween so as to shift the armature into the position illustrated. In the case of a fortuitous extinguishing of the burner, the thermocouple is cooled, the thermoelectric energy disappears, and the relay is no longer energized otherwise than by the original flux which, as mentioned hereinabove, is insufficient for holding the armature in position. Consequently, as soon as the flame of the burner 85 is extinguished, the valve 82 closes and remains closed.

The embodiments described hereinabove by way of an exemplification may obviously be subjected to many modifications, without this unduly widening the scope of the invention as defined in the accompanying claims.

What we claim is:

1. A highly sensitive electric relay, comprising a permanent magnet, two pole-pieces, the inner ends of which operatively face said magnet, an armature cooperating with the outer ends of the pole-pieces, a magnetic shunt including two masses of a magnetic material each carried by a separate one of said pole-pieces at a point along its length, said masses having surfaces facing each other and defining between them an extremely narrow gap having an area which is a multiple of the cross-sectional area of each pole-piece, a winding surrounding at least one pole-piece between the shunt and the outer end of said pole-piece, and means for energizing said winding to produce a flux in the armature cooperating with that produced therein by the permanent magnet.

2. A highly sensitive electric relay, comprising a permanent magnet, two pole-pieces, the inner ends of which operatively face said magnet, an armature cooperating with the outer ends of the pole-pieces, a magnetic shunt including two masses of magnetic material each carried by a different one of said pole-pieces at a point along its length, said masses having surfaces facing each other and defining between them an extremely narrow gap having an area which is a multiple of the cross-sectional area of each pole-piece, means for adjusting the magnetic flux produced in the pole-pieces by the permanent magnet, a winding surrounding at least one pole-piece between the shunt and the outer end of said pole-piece, and means for energizing said winding to produce a flux in the armature cooperating with that produced therein by the permanent magnet.

3. A highly sensitive electric relay, comprising a permanent magnet, two pole-pieces, the inner ends of which operatively face said magnet, an armature cooperating with the outer ends of the pole-pieces, a magnetic shunt including two masses of a magnetic material each carried by a separate one of said pole-pieces at a point along its length, said masses having surfaces facing each other and defining between them an extremely narrow gap having an area which is a multiple of the cross-sectional area of each pole-piece, means for adjusting the spacing between the poles of the magnet and the corresponding pole-piece ends, a winding surrounding at least one pole-piece between the shunt and the outer end of said pole-piece, and means for energizing said winding to produce a flux in the armature cooperating with that produced therein by the permanent magnet.

4. A highly sensitive electric relay, comprising a permanent magnet, two pole-pieces, the inner ends of which operatively face said magnet, each pole-piece including an outer terminal section of a reduced diameter, the outer surface of which is polished, an armature cooperating with the outer surface of the outer section of the pole-pieces and a magnetic shunt including two masses of a magnetic material each carried by a respective one of said pole-pieces at a point along its length, said masses having surfaces facing each other and defining between them an extremely narrow gap having an area which is a multiple of the cross-sectional area of each pole-piece, a winding surrounding at least one pole-piece between the shunt and the outer end of said pole-piece, and means for energizing said winding to produce a flux in the armature cooperating with that produced therein by the permanent magnet.

5. A highly sensitive electric relay, comprising a permanent magnet, two pole-pieces, the inner ends of which extend into operative relationship with said magnet, an armature adapted to be attracted by the outer ends of the pole-pieces into a position leaving an extremely narrow gap between the latter and the armature, a magnetic shunt including two plates each fitted with a tight fit on a different one of said pole-pieces, near its inner end and provided with an opening surrounding with a large gap the pole-piece carrying the other plate, said plates extending in superposition with reference to each other and defining between them an extremely narrow gap having an area which is a multiple of the cross-sectional area of each pole-piece, a thin layer of an amagnetic material filling said gap at least partly, a winding surrounding at least one pole-piece between the plates and the outer end of said pole-piece, and means for energizing said winding to produce in the pole-pieces a magnetic flux cooperating with that produced by the permanent magnet.

6. A highly sensitive electric relay, comprising a permanent magnet, two pole-pieces, the inner ends of which extend into operative relationship with said magnet, an armature adapted to be attracted by the outer ends of the pole-pieces into a position leaving an extremely narrow gap between the latter and the armature, a magnetic shunt including two plates each fitted with a tight fit on a separate one of said pole-pieces near its inner end and provided with an opening surrounding with a large gap the pole-piece carrying the other plate, said plates extending in superposition with reference to each other and defining between them an extremely narrow gap having an area which is a multiple of the cross-sectional area of each pole-piece, a thin layer of an amagnetic material filling said gap at least partly, a carrier plate of amagnetic material in which the inner ends of the pole-pieces are fitted with a tight fit to the rear of the shunt plates and to which the permanent magnet is secured in an angularly adjustable position to allow adjustment of the spacing between its poles and the inner ends of the pole-pieces, rivets of amagnetic material rigidly interconnecting the polar plates and the carrier plate together, a winding surrounding at least one pole-piece between the shunt plates and the outer ends of said pole-piece, and means for energizing said winding to produce in the pole-pieces a magnetic flux cooperating with that produced by the permanent magnet.

7. A highly sensitive electric relay, comprising a permanent magnet, two pole-pieces, an amagnetic carrier for the pole-pieces, an amagnetic rod screwed into said carrier and carrying the permanent magnet in an angularly adjustable position in a plane adjacent the ends of the pole-pieces and perpendicularly in the axis of the latter, an armature adapted to be attracted by the outer ends of the pole-pieces, a magnetic shunt including two masses of a magnetic material each carried by a different one of said pole-pieces at a point along its length, said masses having surfaces facing each other and defining between them an extremely narrow gap with an area which is a multiple of the pole-pieces section, a winding surrounding at least one pole-piece between the shunt and the outer end of said pole-piece, and means for energizing said winding to produce a flux in the armature cooperating with that produced therein by the permanent magnet.

References Cited in the file of this patent

UNITED STATES PATENTS

| | | |
|---|---|---|
| 2,147,101 | Leyburn | Feb. 14, 1939 |
| 2,165,123 | Ballantine | July 4, 1939 |
| 2,579,261 | Indergand | Dec. 18, 1951 |
| 2,678,412 | Smeltz | May 11, 1954 |
| 2,922,082 | Fritts | Jan. 19, 1960 |
| 2,928,029 | Norton | Mar. 8, 1960 |
| 2,941,130 | Fischer | June 14, 1960 |

FOREIGN PATENTS

| | | |
|---|---|---|
| 930,398 | Germany | July 14, 1955 |